US 8,793,789 B2

(12) United States Patent
Sorensen et al.

(10) Patent No.: US 8,793,789 B2
(45) Date of Patent: Jul. 29, 2014

(54) INSIDER THREAT CORRELATION TOOL

(75) Inventors: Amanda Sorensen, Huntersville, NC (US); Allan Byers, Monroe, NC (US)

(73) Assignee: Bank of America Corporation, Charlotte, NC (US)

( * ) Notice: Subject to any disclaimer, the term of this patent is extended or adjusted under 35 U.S.C. 154(b) by 322 days.

(21) Appl. No.: 12/841,332

(22) Filed: Jul. 22, 2010

(65) Prior Publication Data
US 2012/0023576 A1 Jan. 26, 2012

(51) Int. Cl.
H04L 29/06 (2006.01)
G06F 21/57 (2013.01)
G06F 21/78 (2013.01)
G06F 21/70 (2013.01)
G06F 21/50 (2013.01)
G06F 21/55 (2013.01)

(52) U.S. Cl.
CPC .............. *G06F 21/577* (2013.01); *G06F 21/78* (2013.01); *G06F 21/50* (2013.01); *G06F 21/70* (2013.01); *H04L 63/10* (2013.01); *G06F 21/55* (2013.01)
USPC .......................................................... 726/22

(58) Field of Classification Search
CPC ....... G06F 21/50; G06F 21/55; G06F 21/577; G06F 21/70; G06F 21/78; H04L 63/10
USPC ........................................ 726/17, 21, 25, 22
See application file for complete search history.

(56) References Cited

U.S. PATENT DOCUMENTS

| | | | |
|---|---|---|---|
| 5,623,600 A | 4/1997 | Ji et al. | |
| 6,151,643 A | 11/2000 | Cheng et al. | |
| 6,269,456 B1 | 7/2001 | Hodges et al. | |
| 6,785,820 B1 | 8/2004 | Muttik et al. | |
| 6,792,543 B2 | 9/2004 | Pak et al. | |
| 7,080,000 B1 | 7/2006 | Cambridge | |
| 7,080,408 B1 | 7/2006 | Pak et al. | |
| 7,114,183 B1 | 9/2006 | Joiner | |

(Continued)

FOREIGN PATENT DOCUMENTS

| | | |
|---|---|---|
| EP | 1335559 A2 | 8/2003 |
| GB | 2420961A A | 6/2006 |
| GB | 2436161 A | 9/2007 |

OTHER PUBLICATIONS

International Search Report and Written Opinion issued in related International Patent Application No. PCT/US11/44144, dated Dec. 6, 2011.

(Continued)

*Primary Examiner* — Michael S McNally
(74) *Attorney, Agent, or Firm* — Banner & Witcoff, Ltd.; Michael A. Springs

(57) ABSTRACT

Systems and methods for calculating threat scores for individuals within an organization or domain are provided. Aspects of the invention relate to computer-implemented methods that form a predictive threat rating for user accounts. In one implementation, a threat score representing a first time period may be calculated. The first threat score may be calculated from a quantification of a plurality of activity violations across a plurality of control groups. Weighting schemes may be applied to certain activities, controls, and/or user accounts. Further embodiments may be configured to consider additional indicators. Further aspects relate to apparatuses configured to execute methods for ranking individual user accounts. Certain embodiments may not block transmissions that violate predefine rules, however, indications of such improper transmission may be considered when constructing a threat rating.

20 Claims, 5 Drawing Sheets

(56) References Cited

U.S. PATENT DOCUMENTS

| | | | |
|---|---|---|---|
| 7,151,447 B1 | 12/2006 | Willms et al. | |
| 7,228,565 B2 | 6/2007 | Wolff et al. | |
| 7,237,258 B1 | 6/2007 | Pantuso et al. | |
| 7,237,267 B2 | 6/2007 | Rayes et al. | |
| 7,278,019 B2 | 10/2007 | Norman | |
| 7,340,438 B2 | 3/2008 | Nordman et al. | |
| 7,418,733 B2 | 8/2008 | Connary et al. | |
| 7,457,965 B2 | 11/2008 | Tamura et al. | |
| 7,509,680 B1 | 3/2009 | Sallam | |
| 7,546,334 B2 | 6/2009 | Redlich et al. | |
| 7,739,211 B2 | 6/2010 | Coffman et al. | |
| 7,895,448 B1 | 2/2011 | Satish | |
| 8,256,004 B1 | 8/2012 | Hill et al. | |
| 8,275,899 B2 | 9/2012 | Beckett, III et al. | |
| 8,280,844 B2 | 10/2012 | Warn et al. | |
| 8,474,042 B2 | 6/2013 | Sorensen et al. | |
| 8,478,708 B1 | 7/2013 | Larcom | |
| 8,479,286 B2 | 7/2013 | Dalcher et al. | |
| 2003/0145228 A1 | 7/2003 | Suuronen et al. | |
| 2003/0191957 A1 | 10/2003 | Hypponen et al. | |
| 2003/0236995 A1 | 12/2003 | Fretwell | |
| 2004/0044912 A1* | 3/2004 | Connary et al. | 713/201 |
| 2004/0153650 A1 | 8/2004 | Hillmer | |
| 2005/0044406 A1 | 2/2005 | Stute | |
| 2005/0050334 A1 | 3/2005 | Liang et al. | |
| 2005/0086526 A1 | 4/2005 | Aguirre | |
| 2005/0086538 A1* | 4/2005 | Kubota | 713/201 |
| 2005/0183143 A1 | 8/2005 | Anderholm et al. | |
| 2005/0187934 A1 | 8/2005 | Motsinger et al. | |
| 2005/0188221 A1* | 8/2005 | Motsinger et al. | 713/201 |
| 2005/0188222 A1 | 8/2005 | Motsinger et al. | |
| 2005/0188423 A1 | 8/2005 | Motsinger et al. | |
| 2005/0203881 A1 | 9/2005 | Sakamoto et al. | |
| 2005/0273851 A1 | 12/2005 | Raju Datla et al. | |
| 2006/0004594 A1 | 1/2006 | Doliov | |
| 2006/0020814 A1 | 1/2006 | Lieblich et al. | |
| 2006/0041505 A1 | 2/2006 | Enyart | |
| 2006/0064740 A1 | 3/2006 | Kelley et al. | |
| 2006/0178918 A1 | 8/2006 | Mikurak | |
| 2007/0079379 A1 | 4/2007 | Sprosts et al. | |
| 2007/0113281 A1 | 5/2007 | Leach | |
| 2007/0143851 A1 | 6/2007 | Nicodemus et al. | |
| 2007/0169194 A1 | 7/2007 | Church et al. | |
| 2007/0180510 A1 | 8/2007 | Long et al. | |
| 2007/0186282 A1 | 8/2007 | Jenkins | |
| 2007/0204345 A1 | 8/2007 | Pereira et al. | |
| 2007/0222589 A1 | 9/2007 | Gorman et al. | |
| 2007/0226796 A1 | 9/2007 | Gilbert et al. | |
| 2007/0245420 A1 | 10/2007 | Yong et al. | |
| 2007/0268880 A1 | 11/2007 | Bellur et al. | |
| 2008/0034424 A1 | 2/2008 | Overcash et al. | |
| 2008/0082348 A1 | 4/2008 | Paulus et al. | |
| 2008/0109730 A1 | 5/2008 | Coffman et al. | |
| 2008/0162385 A1 | 7/2008 | Madani et al. | |
| 2008/0181213 A1 | 7/2008 | Ovsiannikov et al. | |
| 2008/0198231 A1 | 8/2008 | Ozdemir et al. | |
| 2008/0222734 A1 | 9/2008 | Redlich et al. | |
| 2008/0244034 A1 | 10/2008 | Shannon et al. | |
| 2008/0250484 A1 | 10/2008 | Chong et al. | |
| 2008/0256602 A1 | 10/2008 | Pagan | |
| 2008/0271143 A1 | 10/2008 | Stephens et al. | |
| 2008/0282339 A1 | 11/2008 | Nakae et al. | |
| 2009/0013410 A1 | 1/2009 | Kaler et al. | |
| 2009/0037997 A1 | 2/2009 | Agbabian et al. | |
| 2009/0043724 A1 | 2/2009 | Chesla | |
| 2009/0044005 A1 | 2/2009 | Komura et al. | |
| 2009/0064332 A1 | 3/2009 | Porras et al. | |
| 2009/0077666 A1 | 3/2009 | Chen et al. | |
| 2009/0126023 A1 | 5/2009 | Yun et al. | |
| 2009/0132813 A1 | 5/2009 | Schibuk | |
| 2009/0138592 A1 | 5/2009 | Overcash et al. | |
| 2009/0178139 A1 | 7/2009 | Stute et al. | |
| 2009/0178144 A1 | 7/2009 | Redlich et al. | |
| 2009/0198765 A1* | 8/2009 | Stamos et al. | 709/202 |
| 2009/0207740 A1 | 8/2009 | Crotti et al. | |
| 2009/0241188 A1 | 9/2009 | Komura | |
| 2009/0249131 A1 | 10/2009 | Mitomo | |
| 2009/0254572 A1 | 10/2009 | Redlich et al. | |
| 2009/0271863 A1 | 10/2009 | Govindavajhala et al. | |
| 2009/0293128 A1 | 11/2009 | Lippmann et al. | |
| 2009/0328209 A1 | 12/2009 | Nachenberg | |
| 2010/0064039 A9 | 3/2010 | Ginter et al. | |
| 2010/0065039 A1 | 3/2010 | Chang et al. | |
| 2010/0121833 A1 | 5/2010 | Johnston | |
| 2010/0125911 A1 | 5/2010 | Bhaskaran | |
| 2010/0169971 A1 | 7/2010 | Raviv | |
| 2010/0212010 A1 | 8/2010 | Stringer et al. | |
| 2010/0269175 A1 | 10/2010 | Stolfo et al. | |
| 2010/0281543 A1 | 11/2010 | Golomb et al. | |
| 2011/0078156 A1 | 3/2011 | Koss | |
| 2011/0125658 A1 | 5/2011 | Lanxner et al. | |
| 2011/0153166 A1 | 6/2011 | Yester | |
| 2011/0185056 A1 | 7/2011 | McHugh et al. | |
| 2011/0202969 A1 | 8/2011 | Warn et al. | |
| 2011/0225650 A1 | 9/2011 | Margolies et al. | |
| 2012/0066763 A1 | 3/2012 | McHugh et al. | |

OTHER PUBLICATIONS

International Search Report and Written Opinion of International application No. PCT/US11/44144 mailed Dec. 6, 2011.
International Search Report and Written Opinion issued in related International Patent Application No. PCT/US11/21149, dated Oct. 26, 2011.
International Search Report and Written Opinion issued in related International Patent Application No. PCT/US11/21152, dated Nov. 1, 2011.
International Search Report and Written Opinion issued in related application No. PCT/US11/32515, dated Jun. 27, 2011.
Office Action in related U.S. Appl. No. 12/694,067 mailed Jul. 30, 2013.
Non-Final office action for related U.S. Appl. No. 13/298,597 mailed Sep. 11, 2013.
Non-Final office action in related U.S. Appl. No. 13/903,215 mailed Sep. 12, 2013.
Office action in related U.S. Appl. No. 13/736,594 mailed Oct. 2, 2013.
Office action for U.S. Appl. No. 12/841,323 mailed Nov. 29, 2012.
Office action for U.S. Appl. No. 12/841,323 mailed Jun. 6, 2012.
Notice of Allowance for U.S. Appl. No. 12/841,323 mailed Apr. 11, 2013.
International Search Report and Written Opinion for International application No. PCT/US11/44138 mailed Dec. 6, 2011.
Office action for U.S. Appl. No. 13/298,594 mailed Nov. 14, 2013.
Office action for U.S. Appl. No. 13/298,594 mailed Jun. 19, 2013.
Office action for U.S. Appl. No. 12/694,075 mailed Sep. 4, 2013.
Office action for U.S. Appl. No. 12/694,075 mailed Feb. 4, 2013.
Office action for U.S. Appl. No. 12/694,075 mailed Aug. 10, 2012.
Office action for U.S. Appl. No. 12/694,075 mailed Mar. 27, 2012.
Office action for U.S. Appl. No. 12/694,067 mailed May 22, 2012.
Office action for U.S. Appl. No. 12/694,067 mailed Dec. 21, 2011.
Office action for U.S. Appl. No. 12/694,067 mailed Nov. 7, 2011.
Notice of Allowance for U.S. Appl. No. 12/829,882 mailed Jun. 17, 2013.
Office action for U.S. Appl. No. 12/829,882 mailed Mar. 12, 2013.
Office action for U.S. Appl. No. 121829,882 mailed Aug. 10, 2012.
Notification of Grant from Singapore Patent Office for Patent P-No. 184508 dated Nov. 15, 2013.
Office action for U.S. Appl. No. 11/932,510 mailed Dec. 2, 2013.
Office action for U.S. Appl. No. 11/932,510 mailed Jul. 11, 2013.
Office action for U.S. Appl. No. 11/932,510 mailed Feb. 7, 2011.
Office action for U.S. Appl. No. 11/932,510 mailed Sep. 28, 2010.
International Search Report and Written Opinion for International application No. PCT/US2008/082087 mailed Jan. 13, 2009.
Examination Report for application No. GB1007370.8 mailed Jan. 24, 2012.
Notification of Grant for patent application No. GB2466755 mailed Jan. 2, 2013.
Office action for related U.S. Appl. No. 12/694,067 mailed Feb. 24, 2014.

(56) References Cited

OTHER PUBLICATIONS

Office action for related U.S. Appl. No. 12/694,067 mailed Feb. 13, 2014.
Notice of Allowance for related U.S. Appl. No. 12/694,067 mailed Dec. 9, 2013.
Notice of Allowance in related U.S. Appl. No. 13/298,597 mailed Apr. 14, 2014.
Office Action for related U.S. Appl. No. 12/694,075 mailed Mar. 13, 2014.
Notice of Allowance in related U.S. Appl. No. 13/298,594 mailed May 12, 2014.

* cited by examiner

INSIDER THREAT CORRELATION TOOL

This application is related to U.S. patent application Ser. No. 12/841,323 entitled "Insider Threat Correlation Tool," which was concurrently filed with this application.

BACKGROUND

Increasingly, organizations are responsible for protecting individual's confidential and proprietary electronic information. For example, financial institutions collect and retain vast amounts of personal information in electronic format, therefore the storage and distribution of such information must be closely monitored. This is also true for medical organizations that must effectively collect, store and distribute vast amounts of electronic data while complying with HIPPA (Health Insurance Privacy and Portability Act) and other regulations. Regulating access and distribution of electronic confidential information is more difficult than physical data as it is more readily copied and distributed. Thus, organizations with such information must closely monitor their employees and other individuals to ensure the information is protected, not only from disclosure, but inadvertent contamination.

Prior systems attempted to block certain activities, such as visiting certain sites on the Internet or accessing certain storage devices containing confidential information. Unfortunately, however, blocking sites alone does not provide any indication of a threat. Furthermore, while it may be desirable to block transmissions that pose a serious threat to the organization, blocking each transmission that violates any rule could reduce productivity, efficiency, and frustrate the holder of the blocked user account, the IT department, and/or any third party that needs to receive the transmission, especially if the material is time-sensitive. Additionally, many systems apply a "one size fits all" security policy, which cannot consider the type of user account being monitored.

Current systems also do not provide an overall threat rating that considers several different security measures for individuals within an entity or domain. For example, even if an entity has enacted several individual security measures, a specific user may not meet the "threshold" level to be considered a threat for each individual security measure, despite the fact that they have significantly high activity for several measures, and thus pose an overall threat. In contrast, a user who exceeds one security "threshold" level for only a single measure may incorrectly be deemed a security threat to the entity or domain. In this regard, current systems don't adequately consider individual characteristics of accounts. For example, certain job responsibilities may require some users to have higher than usual activity levels.

Current systems for collecting data from different systems strain valuable resources. Often, the time spent collecting data exceeds the time available to stop or minimize the threat. Therefore, the lag in data does not present an up-to-date indication of the entity's current threats. Moreover, current systems do not allow quick analysis of threats that may readily be navigated for more precise information. Novel systems and methods that improve upon one or more of these and other deficiencies would be desirable.

BRIEF SUMMARY

Aspects of the embodiments address one or more of the issues mentioned above and/or other issues by disclosing methods, computer readable media, and apparatuses configured to calculate threat ratings. Aspects of the invention relate to computer implemented methods that form a predictive threat rating for a plurality of individuals. The plurality of individuals may be members of an organization, such as a corporation or business entity. In one embodiment, the predictive rating is calculated for employees of an organization. Further aspects relate to determinations of whether to calculate or display a threat rating or score for a user account.

In certain embodiments, a threshold quantity of activity violations must occur before a threat rating is calculated for a user account. Yet in other embodiments, a threshold quantity of activity violations must occur within a specific control group or collection of control groups. In one embodiment, a first control group relates to activities regarding targeted communications. For example, in certain embodiments, an indication of any blocked targeted communications may be received. Illustrative targeted communication communications include but are not limited to: e-mail and instant messaging.

Further embodiments may comprise control groups relating to non-blocked transmissions. For example, certain embodiments may not block transmissions that violate one or more predefine rules, however, indications of such improper transmission may be considered when constructing a threat rating in accordance with various embodiments. For example, activity violations that may be considered a low threat to an organization may not be blocked. Nonetheless, even repetitive minor violations may be indicative of lack of training, improper procedures, and/or a threat to an organization. Furthermore, certain activities may not violate a rule of a security application, however, when coupled together with other activities or when associated with certain levels of the activity, may be relevant to the security of an entity's information. Therefore, attributes of such activities may be considered in any threat analysis or whether to calculate a threat score or rating.

Certain embodiments may consider the type or quantity of activity violations that occur in relation to several attributes, such as for example: encryption status, attachment violations, identity of the parties, data patterns, words, and combinations thereof. In certain embodiments, a different threshold may be calculated for different attributes. In certain embodiments, exceeding different thresholds may each be considered an independent activity violation. Yet in another embodiment, the totality of activity violations for a collection of attributes may be considered in any analysis.

Certain embodiments consider whether a blocked communication comprises an attribute similar to an unblocked transmission associated with the same user account. For example, a user may attempt to circumvent security procedures by attempting to transmit a blocked transmission through another mechanism. Further, employees looking to impress their supervisor may want to transmit highly confidential information to their personal email addresses so they may work over a weekend. While the intentions of employee may be genuine, potential disclosure or inadvertent retention of the information could be harmful to the employer and even its clients. Therefore, certain embodiments may implement systems and methods to detect someone sending files to a personal account. In another embodiment, it may be determined if a certain transmissions are transmitted or received through an unauthorized protocol.

Certain aspects disclosed herein relate to determinations of whether to conduct further correlation analysis of the user accounts. In one embodiment, it may be determined if the user account has additional indicators. Illustrative indicators may include: a prior investigation of a user of the user account or another individual, such as a supervisor, the volume or type of information accessible by the user account, whether the user account has an exception to a security policy, factors that suggest suspicious communication activity, and/or whether a user has accessed a specific computer-readable medium during a specific time frame.

Aspects of the embodiments may be provided in a computer-readable medium having computer-executable instructions to perform one or more of the process steps described herein. These and other aspects of the embodiments are discussed in greater detail throughout this disclosure, including the accompanying drawings.

BRIEF DESCRIPTION OF THE DRAWINGS

The present invention is illustrated by way of example and not limited in the accompanying figures in which like reference numerals indicate similar elements and in which.

DETAILED DESCRIPTION

In accordance with various aspects of the embodiments, methods, computer-readable media, and apparatuses are disclosed that assist in the creation, implementation, monitoring, review, and use of predictive threat ratings for several user accounts. The user accounts may be related to an organization, such as employees of an organization.

Figure 1:
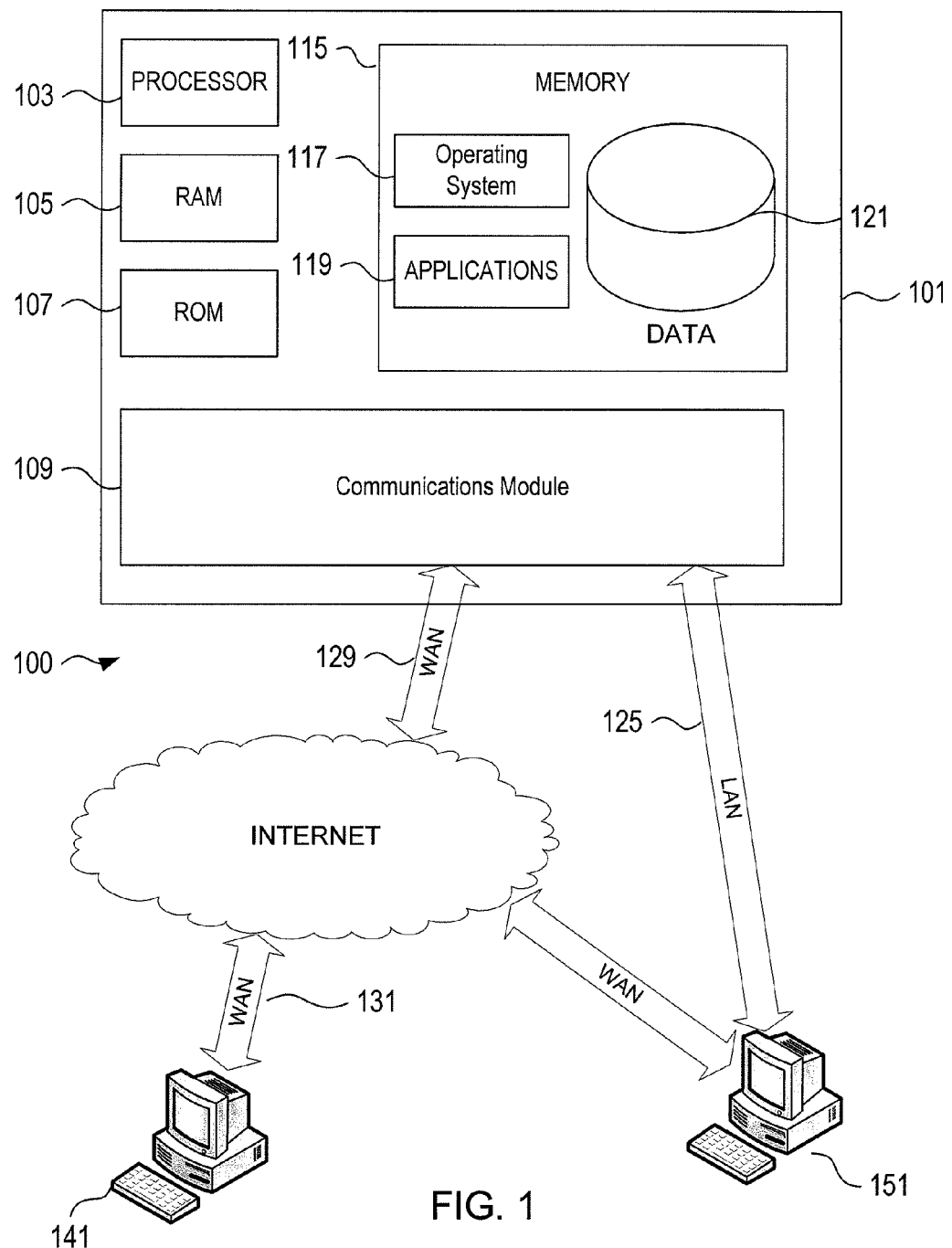
FIG. 1 shows an illustrative operating environment in which various aspects of the embodiments may be implemented.
Figure 2:
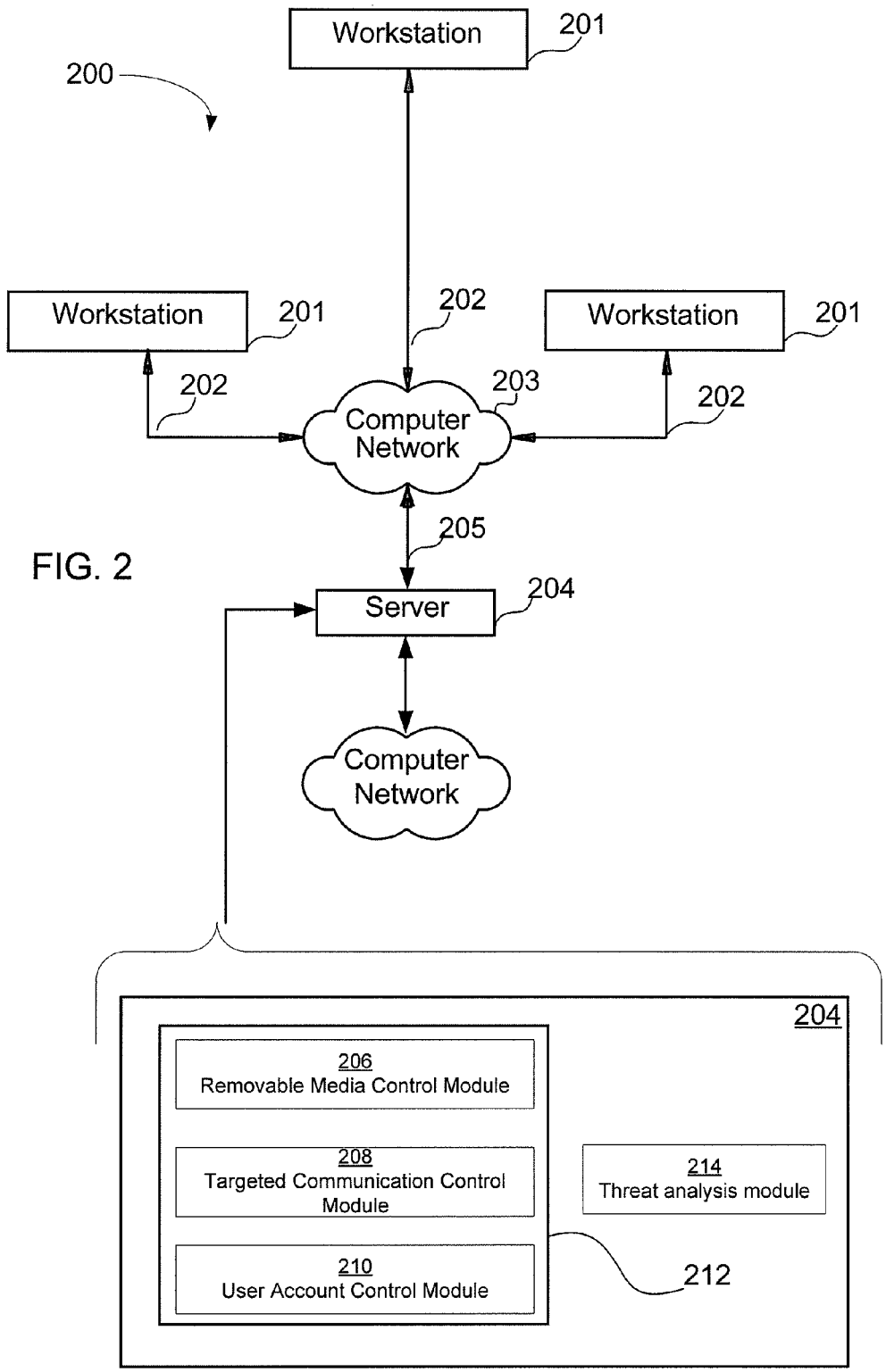
FIG. 2 is an illustrative block diagram of workstations and servers that may be used to implement the processes and functions of certain aspects of the embodiments.
Figure 3:
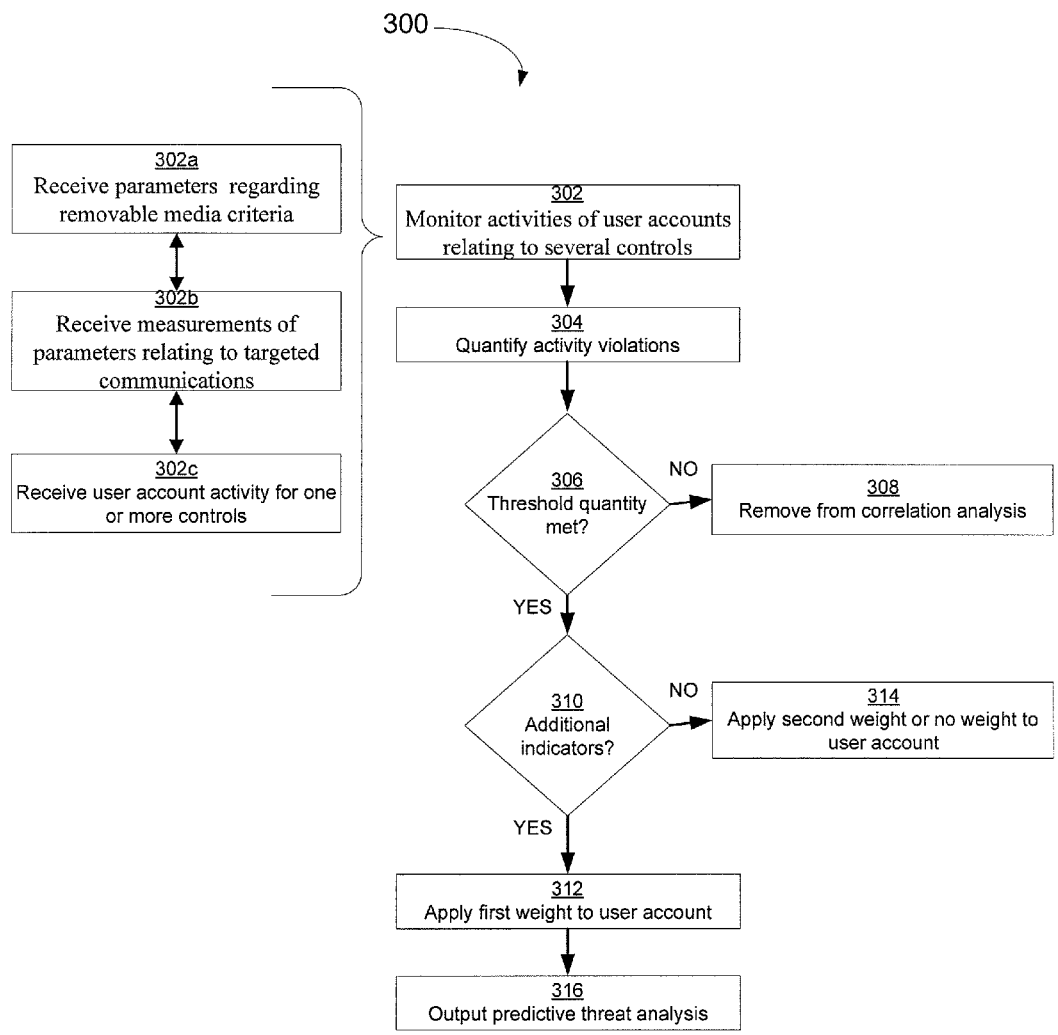
FIG. 3 shows a flow diagram of an illustrative method in accordance with one embodiment.

FIG. 1 illustrates an example of a suitable computing system environment 100 (e.g., for which may be part of illustrative system 200 and/or perform one or more aspects of illustrative process 300 (as shown in FIGS. 2 and 3, respectively). The computing system environment 100 is only one example of a suitable computing environment and is not intended to suggest any limitation as to the scope of use or functionality of the embodiments. The computing system environment 100 should not be interpreted as having any dependency or requirement relating to any one or combination of components shown in the illustrative computing system environment 100.

The embodiments are operational with numerous other general purpose or special purpose computing system environments or configurations. Examples of well known computing systems, environments, and/or configurations that may be suitable for use with the embodiments include, but are not limited to, personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

With reference to FIG. 1, the computing system environment 100 may include a computing device 101 wherein the processes discussed herein may be implemented. The computing device 101 may have a processor 103 for controlling overall operation of the computing device 101 and its associated components, including RAM 105, ROM 107, communications module 109, and memory 115. Computing device 101 typically includes a variety of computer readable media. Computer readable media may be any available media that may be accessed by computing device 101 and include both volatile and nonvolatile media, removable and non-removable media. By way of example, and not limitation, computer readable media may comprise a combination of computer storage media and communication media.

Computer storage media include volatile and nonvolatile, removable and non-removable media implemented in any method or technology for storage of information such as computer readable instructions, data structures, program modules or other data. Computer storage media include, but are not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 101.

Communication media typically embody computer readable instructions, data structures, program modules or other data in a modulated data signal such as a carrier wave or other transport mechanism and include any information delivery media. A modulated data signal is a signal that has one or more of its characteristics set or is changed in such a manner as to encode information in the signal. By way of example, and not limitation, communication media include wired media such as a wired network or direct-wired connection, and wireless media such as acoustic, RF, infrared and other wireless media.

Although not shown, RAM 105 may include one or more applications representing the application data stored in RAM memory 105 while the computing device is on and corresponding software applications (e.g., software tasks), are running on the computing device 101. In one embodiment, RAM 105 and/or any other memory may include a security application. The security application may assist in monitoring activity of one or more user accounts on one or more other devices, such as devices 141 and 151, which are described in more detail below Communications module 109 may include a microphone, keypad, touch screen, and/or stylus through which a user of computing device 101 may provide input, and may also include one or more of a speaker for providing audio output and a video display device for providing textual, audiovisual and/or graphical output.

Software may be stored within memory 115 and/or storage to provide instructions to processor 103 for enabling computing device 101 to perform various functions. For example, memory 115 may store software used by the computing device 101, such as an operating system 117, application programs 119, and an associated database 121. Alternatively, some or all of the computer executable instructions for computing device 101 may be embodied in hardware or firmware (not shown). As discussed above, memory 115 may comprise one or more security applications, some of which will be described below.

Database 121 may provide centralized storage of response information. Processor 103 may access the response information from database 121 and process the response information that may be included in an interactive response to a user. While database 121 is shown to be internal to computing device 101, database 121 may be external to computing device 101 with some embodiments.

Computing device 101 may operate in a networked environment supporting connections to one or more remote computing devices, such as user terminals 141 and 151. Additional computing devices and the arrangement of such devices are described in illustrative embodiment shown in FIG. 2. The user computing devices 141 and 151 may be personal computing devices or servers that include many or all of the elements described above relative to the computing device 101.

The network connections depicted in FIG. 1 include connections through multiple networks. For example, in one embodiment, a local area network (LAN) 125, may be an organization's intranet, and a wide area network (WAN) 129, may be the Internet. In one embodiment implementing a LAN networking environment, computing device 101 may be connected to the LAN 125 through a network interface or adapter in the communications module 109. When used in a WAN networking environment, the server 101 may include a modem, or interface in the communications module 109 or other means for establishing communications over the WAN 129, such as the Internet 131. Thus, from a security perspective, one user account may be configured to access a LAN, such as LAN 125, however, not to access one or more WANs, such as WANs 129/131.

It will be appreciated that the network connections shown are illustrative and other means of establishing a communications link between the computing devices may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages. The network connections may also provide connectivity to a CCTV or image/iris capturing device.

Additionally, one or more application programs 119 used by the computing device 101, and/or user terminals 141/151 according to an illustrative embodiment, may include computer executable instructions for invoking user functionality related to communication including, for example, email, short message service (SMS), and/or other targeted communications applications that transmit communications from a user account to a second user account (whether internal or external to the organization or domain of the first user account).

Embodiments of the invention may include forms of computer-readable media. Computer-readable media include any available media that can be accessed by a computing device 101. Computer-readable media may comprise storage media and communication media. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Although not required, one of ordinary skill in the art will appreciate that various aspects described herein may be embodied as a method, a data processing system, or as a computer-readable medium storing computer-executable instructions. For example, a computer-readable medium storing instructions to cause a processor to perform steps of a method in accordance with aspects of the embodiments is contemplated. For example, aspects of the method steps disclosed herein may be executed on a processor on a computing device 101. Such a processor may execute computer-executable instructions stored on a computer-readable medium.

Referring to FIG. 2, an illustrative system 200 for implementing methods according to some embodiments is shown. As illustrated, system 200 may include one or more workstations 201. In one embodiment, workstations 201 are similar to user terminals 141/151 shown in FIG. 1. Workstations 201 may be local or remote, and may be connected by one of communications links 202 to computer network 203 linked via communications links 205 to server 204. In system 200, server 204 may be any suitable server, processor, computer, data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, and the like. Connectivity may also be supported to a CCTV or image/iris capturing device.

With some embodiments, illustrative system 200 may support an interactive system as will be further discussed. For example, workstations 201 may function as user terminals and server 204 may function as a security application control system that monitors activities of multiple user accounts on workstations 201. As understood by those skilled in the art, the steps that follow in FIGS. 3-6 may be implemented by one or more of the components in FIGS. 1 and 2 and/or other components, including other computing devices.

Aspects of the invention relate to monitoring, measuring, or detecting activities relating to one or more controls. The controls may relate to disparate activities associated with user accounts. Monitoring controls may assist further determinations whether a user account represents a threat to an organization. In one embodiment, one or more of the "user accounts" may be associated with a particular individual, such as an employee of an organization. Thus, regardless of whether the individual is using user terminal 141, user terminal 151, or any workstation 201, the individual's actions may be tied to a particular user account. In an alternative embodiment, a "user account" may be associated with a particular computing device. Thus, in one embodiment, if any of a plurality of individuals uses a particular computing device, such as user terminal 141, the computing device will be a specific user account. In another embodiment, a "user account" may be a combination of specific user(s) on specific computing device(s).

As would be understood by those skilled in the art, it is quite common for a subset of user accounts within an organization or domain to have access to resources not available to other user accounts within the same organization or domain. Unlike prior art systems, embodiments disclosed herein may be used to monitor activities across an organization or domain having user accounts with security features that differ from other user accounts. For example, in one embodiment, each user account may have access to a first network, such as the "Internet" through WAN 131 shown in FIG. 1, however, only a subset of those accounts may have access to a second network, such as specific resources accessible on the organization's or domain's intranet, such as through LAN 125. In one embodiment, the resources may include a centralized store of electronic data that is accessible from several different user terminals 141/151 or workstations 201.

FIG. 3 shows flowchart 300 of illustrative methods that may be implemented in accordance with various embodiments of the invention. According to certain embodiments, activities of user accounts relating to several controls may be monitored, measured or detected (see, e.g., block 302). Any detectable activity, such as the transmission of electronic information (either receiving or transmitting), may be used as a control as described herein. Some illustrative activities which serve as one or more controls may include, but are not limited to: blocked communication through the targeted communication application, communication through the targeted communication application meeting the predefined criterion, accessing a specific computer-readable medium, an illegal storage attempt, and/or any combinations thereof. Further, several controls may be categorized as in one or more control groups. Indeed, aspects of the invention relate to correlating certain controls that may be detected through different processes.

As used herein, a "targeted communication application" encompasses those applications that allow a first user to directly communicate with another individual. For example, common targeted communication applications include, but are not limited to: electronic mail (e-mail), instant messaging (IM), chatting, and combinations thereof. Such applications may allow one account associated with a first user, which may be an employee of the organization to transmit and/or receive electronic information directly to a second account associated with a second user, which may be external to the organization.

From the foregoing it is to be understood that the controls may relate to disparate activities associated with user accounts. For example, several different security applications may be implemented across a network to monitor, measure and/or detect disparate activities. Thus, different controls may be grouped into one or more control groups. For example, one entity (such as a commercial establishment having sensitive medical records) may have a first control group comprising controls relating to activity of targeted communications (such as, for example, electronic mail, instant messaging, and/or chatting applications) and a second control group that monitors non-targeted network traffic (such as including communications using HTTP, FTP, and/or other protocols). The groups may be logically or physically distinct as dictated by the security applications implemented, storage of data, entity-specific concerns, or other variables. Yet, a second entity (such as financial institution having sensitive financial data) may have a first group that monitors all traffic (regardless of whether it's a targeted communication or not) using a specific protocol and a second control group that monitors traffic using a second protocol. For example, in one embodiment, an entity may have a secure communications channel that transmits and/or receives traffic transmitted with a first authentication protocol and activities transmitted with another authentication protocol (or in the absence of an authentication protocol) may be within another group. Illustrative methods of detecting secure or encrypted channels, protocols, or "tunnels" are described in U.S. Provisional Application No. 61/325,055, entitled "Detecting Secure or Encrypted Tunneling in a Computer Network," filed Apr. 16, 2010, and U.S. Non-Provisional application Ser. No. 12/829,882, entitled "Detecting Secure or Encrypted Tunneling in a Computer Network," filed Jul. 2, 2010, which are incorporated herein by reference in their entirety for any and all purposes.

Therefore, as used to describe certain aspects wherein, reference to a group is provided to indicate a collection of two or more controls that are detected, measured or monitored by overlapping or different processes, that have a common characteristic with other controls in the group. As discussed in more detail below, aspects of certain embodiments permit consideration of several different security measures for individuals within an entity or domain. Implementation of certain systems and methods disclosed herein may prevent potential security or ethical breaches. For example, even if an entity enacts several individual security measures, a specific user may not meet the "threshold" level to be considered a threat for each individual security measure, despite the fact that they have significantly high activity for other measures, and thus may pose an overall threat or concern. In contrast, with prior art systems, a user who exceeds one security "threshold" level for only a single measure may incorrectly be deemed a security threat to the entity or domain.

Further, those of ordinary skill in the art will appreciate that of receiving an indication of the detection would fall in the scope of "detecting" an activity. Further, "detecting" may refer to the obtaining or receiving an indication of a measurement, which may be based upon a known scale or measurement system. Further, "detecting" may also be used to refer to measuring the absence of an activity. For example, as opposed to an affirmative detection which may reveal that a specific activity occurred 3 times and/or resulted in a measurement of "3×," another detection of the same activity may output the lack of activity between the 3 specific incidences of activity detected above. Illustrative activities are described below, however, those skilled in the art with the benefit of this disclosure will readily understand that additional or fewer activities may be measured without departing from the scope of the invention. Further, while the illustrative activities are described in relation to certain processes or components, those skilled in the art will understand that such actions may be conducted in relation to one or more additional processes.

Figure 4:
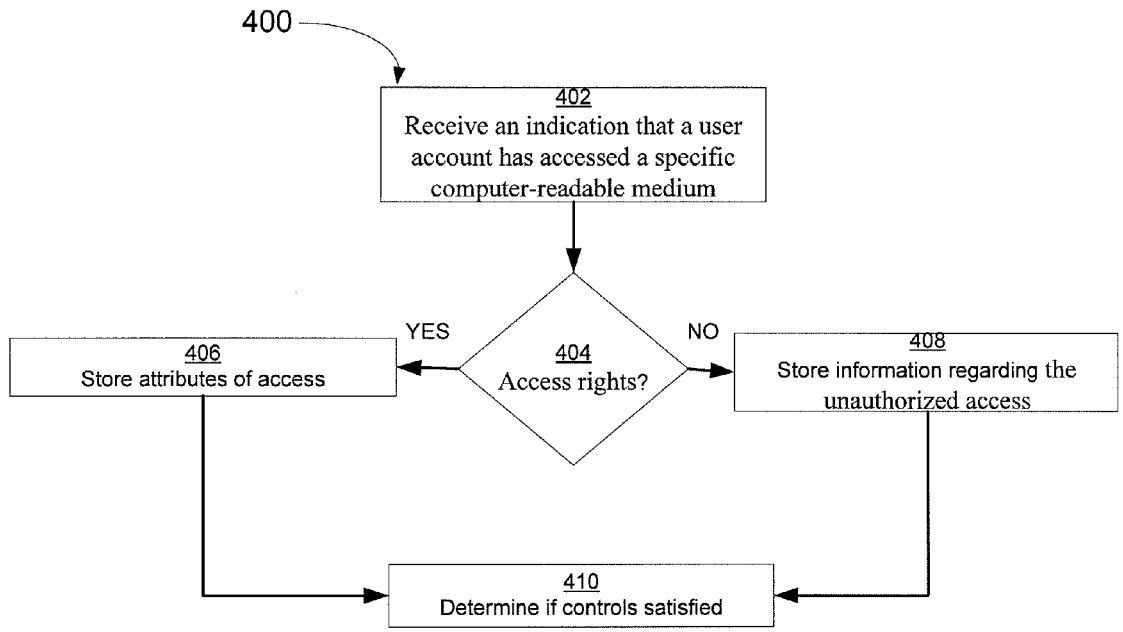
FIG. 4 shows a flow diagram of an illustrative method in accordance with one embodiment.
Figure 6:
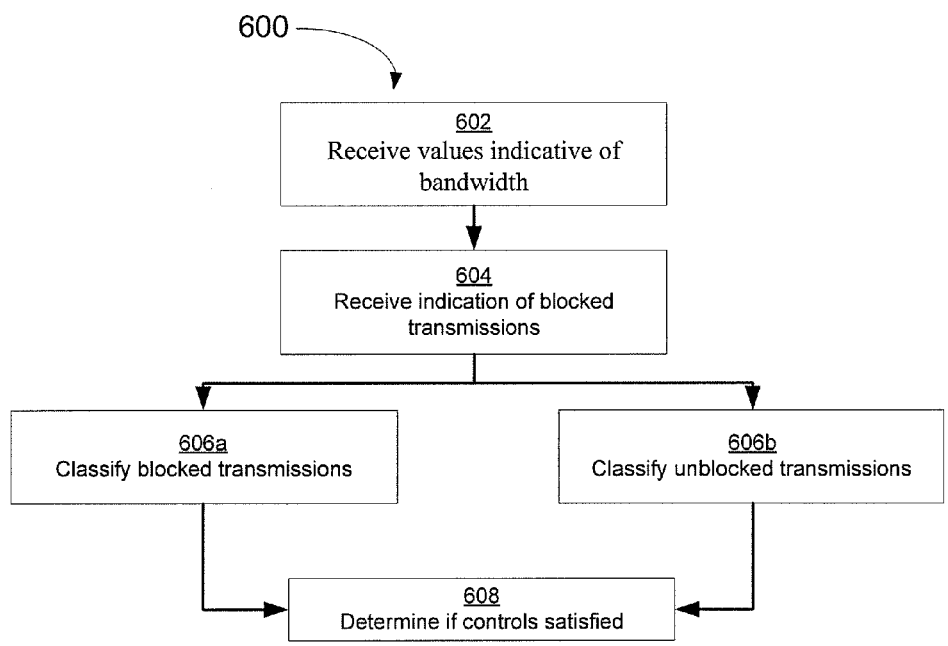
FIG. 6 shows a flow diagram of an illustrative method in accordance with one embodiment.

As discussed above, a first control group may be configured to detect parameters relating to one or more controls, such as regarding removable media criteria (see, e.g., block 302*a*). FIG. 4 shows a flowchart 400 of illustrative methods relating to removable media controls. In certain embodiments, one or more methods conducted in accordance with the teachings of flowchart 400 may be partially or wholly conducted by a removable media control module 206, which may be located at server 204 of FIG. 2. Although FIG. 4 is explained in the context of removable media, those skilled in the art will readily appreciate that non-removable media may be monitored using many, if not all, of the processes described herein. Therefore, unless explicitly indicated otherwise, non-removable media is within the scope of illustrative embodiments.

Looking first to block 402, one or more processes may be implemented to receive an indication that a user account has accessed a specific computer-readable medium (which may be a removable memory). In one embodiment, block 402 may detect a computer-readable medium operatively connected to computer device, such as for example, through a Universal Serial Bus (USB) connection on devices 141 and/or 151 shown in FIG. 1. In certain embodiments, the detection may be received through a security application. For example, the security application may be configured to monitor illegal write attempts for data loss prevention purposes. For example, some user accounts may be prohibited from writing to removable storage devices, thus in block 402 an indication of any such attempts may be provided. While the illustrative embodiment is described in relation to "write" attempts, those skilled in the art will readily appreciate that "reading" from certain sources may also violate one or more predefined rules.

Information associated with the illegal write/read attempts may also be collected. Illustrative information may include, but is not limited to: the filename, the size of the file, the location of the file, or any metadata regarding the file. In one embodiment, block 402 may compare a value from the computer-readable medium, such as a volume value, a MAC address, or other identifier against a collection of approved identifiers. For example, block 402 may comprises one or more processes to detect any non-approved storage devices.

In certain embodiments, it may be determined whether the user has rights to access the computer-readable medium (see, e.g., block 404). For example, certain systems may be configured to permit a user account to access any and all removable mediums; however, another system may be configured to allow a user account to access certain media types, such as a DVD drive, however, not a flash drive. Another system may be configured to authorize access to certain removable media when a user is logged into a specific device. If it is determined that a user account has rights to access a specific medium, one or more attributes (or values thereof) of the access may be stored on a computer-readable medium (block 406). In one embodiment, information regarding the attributes may be stored on memory 115 of device 101 shown in FIG. 1. Illustrative attributes may include, for example, a quantity of data transferred, size or name of a file accessed, time of access, access protocols, among others.

If it is determined at block 404 that a user account does not have authority to access the computer-readable medium, information regarding the unauthorized access attempt may be stored (see, e.g., block 408). For example, a security application may determine or otherwise detect an activity violation as a result of the unauthorized access attempt. In one embodiment, information regarding an access attempt may be stored on memory 115 of device 101 shown in FIG. 1. Further, block 408, may be implemented to store attributes of unauthorized storage attempts. Illustrative attributes may include, for example, a quantity of data attempted to be transferred, size or name of a file that was attempted to be accessed, time of attempted access, access protocols attempted, among others.

Block 410 may be implemented to determine if one or more controls have been satisfied. In one embodiment, one or more of the following may be considered a control relating to removable media: detection of an unauthorized access attempt; a threshold of unauthorized access attempts; an attribute of an unauthorized access attempt; detection of a threshold level of authorized accesses; an attribute of one or more authorized accesses; and combinations of one or more of these. While block 410 is shown as being specific to removable medium criteria, those skilled in the art with the benefit of this disclosure will appreciate that the determination of whether controls have been satisfied may be specific to one control group or a plurality of controls groups, including any other collection of controls disclosed herein.

Block 410 or any determination of whether one or more controls have been satisfied may be considered in the context of a time period. For example, a determination of whether two controls have been satisfied, either in the context of block 410 or a combination of disparate activities may be made within a fixed time period. In various embodiments, a plurality of activities serve as controls for monitoring the accounts over a first time period, such as about 7 days. In another embodiment, a time period may be about 24-48 hours. Enabling the reception of data within the relatively short time period allows IT or security personnel to act quickly to prevent or minimize any adverse events. In certain embodiments, monitoring the activity for about 24-48 hours ensures adequate collection of data. The values received for a control may be compared with values from the controls during a second time period. In the illustrated embodiment, block 410 (and/or any other quantification of activities) may be implemented to receive an indication of values for one or more activities associated with a user account. In one embodiment, different activities for various controls may be monitored for about a one week period. In one embodiment, one or more computer—executable instructions measure at least a portion of the activities on computing devices, such as user terminals 141/151 and/or workstation 201. The computer-executable instructions may be read by processor 103 on device 101 shown in FIG. 1.

Returning briefly to FIG. 3, block 302b may be implemented to measure or receive measurements of parameters relating to targeted communications of the user accounts. In one embodiment, targeted communications encrypted with a specific encryption protocol may be monitored or detected by a first security application while targeted communications encrypted with a second protocol or non-encrypted targeted communications (as well as other non-encrypted communications) may be monitored with a second security application or method. Despite comprising similar actions, many prior art systems may not correlate an unauthorized email transmitted through one mechanism with a second unauthorized instant message transmitting similar information. Thus, depending on a particular configuration disclosed herein, multiple control groups may be monitored to correlate activity violations.

Figure 5:
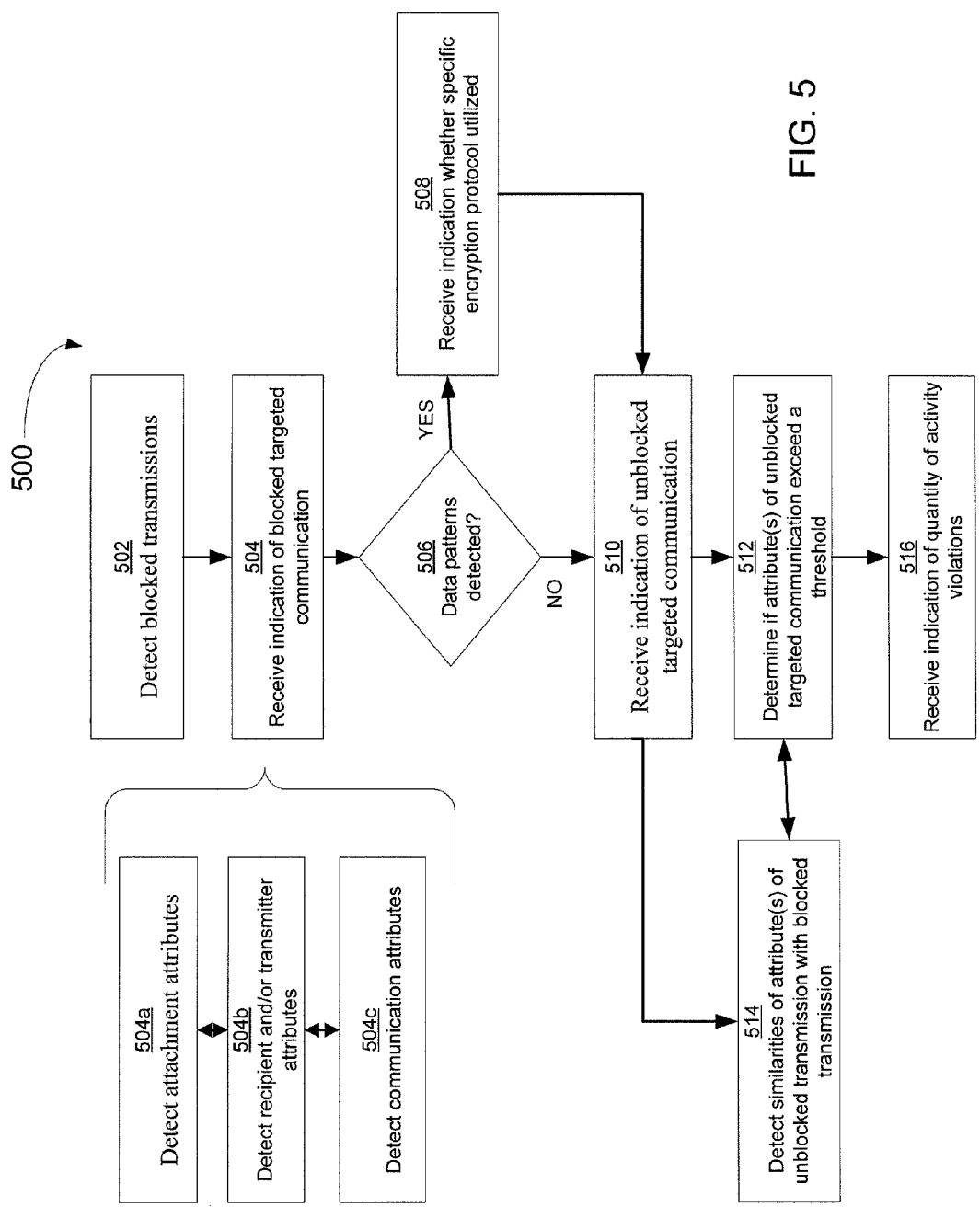
FIG. 5 shows a flow diagram of an illustrative method in accordance with one embodiment.

FIG. 5 shows a flowchart 500 of illustrative methods that may be implemented to detect activity violations relating to targeted communications in accordance with various embodiments. In certain implementations, one control group may monitor all targeted communications, yet in another embodiment, one control group may only monitor targeted communications conducted with a certain protocol or encryption, and a second control group may monitor further targeted communications. In still yet further embodiments, a single control group may monitor targeted communication and non-targeted communication. For simplicity, illustrative implementations will be discussed below; however, the reader is advised that the illustrative embodiments provide an overview of one collective embodiment and that other embodiments are taught by the disclosure of these embodiments. In certain embodiments, one or more methods disclosed in relation to flowchart 500 may be performed, at least partially, by a targeted communication control module 208 (FIG. 2), which may be located within or otherwise associated with a server, such as server 204 of FIG. 2.

In one embodiment, systems or methods may be implemented to detect a blocked transmission (see, e.g., block 502). For example, in one embodiment, blocked transmissions using a certain encryption protocol may be detected. Certain encryption protocols may scan a targeted communication for specific patterns. For example, certain implementations may prevent the transmittal (including the reception of) confidential or proprietary information, including but not limited to: social security numbers, medical data, or other information. In other embodiments, certain encryption protocols may prevent types of attachments to be transmitted.

The indication of blocked transmissions may be restricted to a specific network or group of networks. For example, in one embodiment, controls may be specific to activity on the Internet. Yet in other embodiments, the indications may include activity on the Internet as well as specific network resources within an organization's intranet that may be restricted to certain user accounts. Thus, unlike certain prior art systems, certain embodiments may allow for the quantification of how many instances the user account's actions on a network (or networks) are blocked.

In accordance with various implementations, a targeted communication may be blocked upon detecting an attribute of the transmission (block 504). In one embodiment, an attribute relates to an attachment of the targeted communication (see, e.g. 504a). For example, in certain embodiments, illustrative attributes that may be utilized include, but are not limited to: file types, such as executable (i.e., *.exe) files, the name of an attachment, size, creation or modification date(s), the presence of data patterns inclusive of words within the attachment, or combinations of these and other attributes. Further embodiments may be configured to detect other attributes, such as information relating to parties (e.g., the recipient or sender) of the targeted communication (e.g. block 504b). For example, certain systems and methods may be implemented to block communications to certain domains, such as domains which may be associated with spamming, illegal activities, or providing services not relevant to an employee's job.

In another embodiment, a party's electronic address or username may be considered. For example, if a username or address comprises explicit language or values that violate a predefined rule, certain embodiments may block the transmission. Any other additional attributes may be considered, for example, block 504 may be implemented to detect data patterns in any text or other data being transmitted. For example, emails and chatting sessions may be scanned for patterns relating to types of confidential information.

In one embodiment, block 504c may be used to scan the body of an email (or receive an indication of a scan) for the inclusion of a social security number within the body of the email and block 504a may be implemented to detect a social security number or other information within an attachment associated with the email. In this regard, blocks 504a-504c may be conducted simultaneously and/or by a single application. Yet in other embodiments, two or more applications may operate independently to perform one or more of blocks 504a-504c. Further, in certain embodiments, detection of certain data patterns may result in further analysis. For example, block 506 may determine whether certain data patterns were detected (criteria) within a targeted communication. If, at block 506, it has been determined that certain information is associated with the targeted correspondence, then further attributes may be considered. For example, if a social security number is detected, block 508 may be implemented to confirm that a specific encryption protocol was utilized. Those individuals of ordinary skill in the art with the benefit of this disclosure will appreciate that other attributes may be considered and that blocks 504a-504c are merely illustrative.

In certain embodiments, which are described further below, the determination of whether an activity violation has occurred may depend on whether certain attributes are detected, such as whether an encryption protocol has been utilized. Yet in other embodiments, the blocked transmission alone due to violation of a guideline may be considered a first activity violation, yet further activity violations related to the same targeted communication may be quantified as a second activity violation.

Further embodiments may monitor or detect attributes of a successfully transmitted communication (e.g., block 510). In one embodiment, block 510 detects successfully transmitted targeted communications. While block 510 is shown after blocks 502-508, those skilled in the art with the benefit of this disclosure will appreciate that step 510 (or any other process) is not required to follow or even be after any other process unless explicitly stated to the contrary. In this regard, block 510 may be conducted independent of blocks 502-508. Looking to block 510, not all activity violations may result in blockage of a targeted communication. For example, activity violations that may be deemed less of a threat to an organization may not prevent transmission of the communication. Nonetheless, repetitive minor violations may be indicative of lack of training, improper procedures, and/or a threat to an organization. Therefore, in certain embodiments, block 512 and/or another process may be implemented to receive an indication that a threshold quantity of unblocked targeted communications may be associated with the first user account.

Block 512 may detect one attribute or multiple attributes. For example, in one embodiment, in block 512 it may be determined how many activity violations occurred in relation to each of several attributes, such as for example: encryption status, attachment violations, identity of the parties, data patterns, words, and combinations thereof. In certain embodiments, a different threshold may be calculated for different attributes. In certain embodiments, exceeding each of the different thresholds may be considered an independent activity violation. Yet in another embodiment, the totality of activity violations for a collection of attributes may be considered in the analysis.

Block 514, which may be part of block 512, another process, or independent of other processes described herein, may be implemented to detect (or receive an indication of) similarities. For example, in one embodiment, a process may receive an indication whether user names and aliases, such as email address, usernames, profiles or other information associated with a user account are similar to a recipient of transmitted information, such as an email address. For example, employees looking to impress their supervisor may want to transmit highly confidential information to their personal email addresses so they may work over a weekend. While the intentions of employee may be genuine, potential disclosure or inadvertent retention of the information could be harmful to the employer and even its clients. Therefore, certain embodiments may implement systems and methods (such as shown by block 514) to detect someone sending files to a personal account.

Looking to block 514, further embodiments may be implemented to receive an indication that an email or other communication comprises a first attribute having a first value that is similar to a second value of the first attribute of a blocked transmission from the user account within a first time period. Information obtained during blocks 502-512 and/or from other systems and methods may be utilized to obtain attribute values from blocked communications. For example, an entity may prefer that certain types of data or correspondence be transmitted using authorized authentication protocols. Thus if an employee attempted to transmit sensitive data through the proper channel but was blocked (such as for violating a security feature, certain embodiments may detect if a similar transmission by the same user account was used to transmit the sensitive data. For example, a signal may indicate that a targeted communication successfully transmitted from the user account comprises a first attribute having a first value that is similar to a second value of the first attribute of a blocked transmission from the user account within a first time period.

In one embodiment, an indication may suggest that a successful transmission comprises a detected similarity to a blocked transmission; therefore, block 514 may be implemented to compare a recipient attribute with a collection of attributes to detect an attribute match. Depending on the embodiment, the collection of attributes may include identifying information of the first user account. Thus, a process, which may be performed as part of block 514, may compare user names and aliases with email address attributes of the recipient address to detect someone sending files to a personal account. Yet in further embodiments the collection of attributes may include information relating to a specific third party entity. (for example, it may detect names, or "competitor.com" or may be DNS address of known competitors or spammers).

Block 516 may be implemented to determine if one or more controls have been satisfied (or if any activity violations have been detected). In one embodiment, block 516 may quantify activity violations during a time period. While block 516 is shown as being specific to transmissions associated with a targeted communications, those skilled in the art with the benefit of this disclosure will appreciate that the determination of whether controls have been satisfied may be specific to one control group or a plurality of control groups, including any other collection of controls disclosed herein. For example, detecting a single blocked targeted communication may result in a determination that a control has been satisfied. If however, the blocked targeted communication is within a certain time period in which an unblocked transmission comprises similar or the same attribute values as the blocked targeted communication, then each may be quantified as an activity violation. Yet in other embodiments, the totality of both events within the time period may be considered a single activity violation. In further embodiments, detecting a threshold level (such as 3) of blocked targeted communications within a time period may be deemed a security violation. A determination of whether one or more controls have been satisfied may be considered in the context of a different time periods.

Those skilled in the art with the benefit of this disclosure will readily appreciate that other control groups may be monitored using variations of the flowcharts and related systems disclosed in relation to FIGS. 3, 4 and 5. In this regard, certain methods may monitor non-targeted transmissions (either separately from or in conjunction with monitoring targeted communications). For example, one or more values indicating the bandwidth utilized by a user account may be received. (See blocks 302c and 602 of FIG. 6). In certain embodiments, a user account control module, such as user account control module 210 (FIG. 2) may be utilized. User account control module 210 may be located within or otherwise associated with server 204 or any other computing device. In this regard, those skilled in the art with the benefit of this disclosure will appreciate that any control modules, including removable media control module 206, targeted communication control module 208, and/or user account control module 210 disclosed herein, may be a single control module, such as control module 212. Yet in other embodiments, one or more control modules may be independent, and/or located on a different computing device.

The values may indicate the amount of data received, transmitted, or combinations thereof. The measured valued may indicate the transfer of data through a first network, such as through WAN 131 to the Internet. Thus, in certain embodiments, the values may not measure all traffic through multiple networks, but rather may just be indicative of specific traffic, such as sites that are external to an organization's resources.

An indication of blocked transmissions enforced upon a user account may also be received (see e.g., block 604). The indication of blocked transmissions may be restricted to specific communication protocols, including for example, HTTP, FTP, or any other protocols. The indication of blocked transmissions may also be restricted to a specific network or group of networks. For example, in one embodiment, indications may be for activity on the Internet. Yet in other embodiments, the indications may include activity on the Internet as well as specific network resources within an organization's intranet that may be restricted to certain user accounts. Thus, certain embodiments may allow for the quantification of how many instances the user account's actions on a network are blocked.

Further embodiments may classify the blocked transmissions as posing certain types of threats. In certain embodiments, blocked (or even unblocked transmissions) may be classified as an ethical threat or a security threat. (see blocks 606a and 606b). Illustrative systems and methods are disclosed in U.S. patent application Ser. Nos. 12/694,067 and 12/694,075, each entitled "Insider Threat Correlation Tool," which are incorporated by reference herein in their entirety for any and all purposes. In still further embodiments, certain activities of user accounts may be weighted. Illustrative systems and methods are also disclosed in U.S. patent application Ser. Nos. 12,694,067 and 12/694,075, which have been incorporated herein in their entirety for any and all purposes. Block 608 may be implemented to determine if one or more controls have been satisfied (or if any activity violations have been detected). Similar to block 516, block 608 may be omitted and/or combined with other determinations of whether certain controls have been satisfied.

Returning to FIG. 3, block 304 may be implemented to quantify activity violations of controls within the control groups. For example, information from one or more of flowcharts 400, 500, or 600 may be utilized. In certain embodiments, a threshold quantity of controls being satisfied may cause the user account to be marked or flagged as a potential concern. In certain embodiments, the threshold quantity requires that at least one control be satisfied from at least a portion of the control groups. Yet in other embodiments, the threshold quantity may be satisfied by activity violations within one control group.

If at block 306 it is determined that a threshold quantity is not met, then activity violations of a user account may not be considered in further correlation analysis (see, block 308). In other embodiments, the activity violations may not be totally disregarded from further correlation analysis, however, may be weighted less than activity violations that meet a threshold.

If, at block 306, it is determined that a threshold is met, further correlation analysis may be conducted. In one embodiment, block 310 may be implemented to determine if the user account has additional indicators. An illustrative indicator may include, for example, a prior investigation of another individual. In certain embodiments, a prior investigation of an associate, a peer, or a manager may be used. Such information may be utilized to detect acts of collusion. Further embodiments may consider whether a threshold of controls has been satisfied for another user account, such as an account of an associate, a peer, or a manager. Another indicator may be related to the volume or type of information accessible by the user account. For example, if a specific user account has access to large volumes of sensitive data, monitoring that account may be more important than monitoring other accounts that do not have access to sensitive data.

A further indicator that may be implemented at block 310 or any other process may be whether the user account has an exception to a security policy. For example, certain user accounts may require access to sites not accessible to other user accounts, thus it may be advantageous to more closely monitor such accounts as the risk for disclosure of information and/or reception of a virus may be increased. In certain embodiments, block 312 or another process may serve to weight certain activity violations once it has been determined that the threshold has been satisfied. For example, in certain embodiments, an indicator may consider whether a recipient address of a targeted communication meets certain criteria, such as being associated with a webmail account and/or appears to be personal address of a user associated with the user account. In another embodiment, if a threshold of activity violations relate to targeted communications, then block 310 or another process may compare the "subject line" or header information to detect similarities. Further indicators may include factors that suggest suspicious communication activity, either through an intranet or the internet, and whether a user has accessed a specific computer-readable medium during a specific time frame.

In certain embodiments, the presence of a threshold of additional indicators (e.g. at block 310) may weight the user account with an elevated "risk" ranking (see, e.g., block 312). The absence of additional indicators or the lack of a threshold of additional indicators may result in the user account being associated with a less-elevated "risk" ranking (see, e.g., block 314). In other embodiments, the user account may not be factored into any risk ranking unless a threshold of additional indicators are met.

Block 316 may be implemented to output a predictive threat analysis of one or more user accounts. In one embodiment, a score may be assigned to a plurality of user accounts. The score may be a numeric value (e.g., on a scale of 0 to 100) or may be a letter value (e.g., an A+ to F scale). A score, which may be relative or absolute, may be based upon a threshold quantity of controls satisfied within a first time period. The score may further consider the type of controls associated with any activity violations. In certain embodiments, the score factors the inclusion of additional indicators. The inclusion of additional indicators may consider the quantity and/or type of additional indicators. Information may be stored in a database and accessible by a graphical user interface ("GUI"). In this regard, aspects disclosed herein may be implemented to score and/or rank several user accounts. In one embodiment, the ranking or score of several user accounts may be transmitted through a network and displayed as part of a graphical user interface.

In one embodiment, a system which comprises a processor and a memory may be configured to transmit electronic signals configured to display the ranking or score of the user accounts. Further embodiments relate to receiving a user input selecting a graphical representation of certain activities or criteria utilized in the ranking of the user accounts. In one embodiment, a graphical display of blocked communications may be displayed. In further embodiments, whether any attributes of the blocked communication were similar to attributes of unblocked transmissions may be displayed. Any aspect of a user account that may be utilized in calculating the threat score or ranking may be displayed. Indeed, any information collected, transmitted, or received herein may be preserved and utilized for display in a GUI. A threat analysis module, such as threat analysis module 214 of FIG. 2, which may be located on any computing device, such as server 204 of FIG. 2 may be used in the determination or output of any analysis or score.

Aspects of the embodiments have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the embodiments

We claim:

1. A non-transitory computer-readable medium comprising computer-executable instructions that when executed by a processor cause the processor to perform:
   detecting activities associated with a plurality of user accounts within a business entity and involving a plurality of control groups, wherein each user account is associated with a different individual of the business entity, wherein the plurality of user accounts comprises a first user account and a second user account, and wherein at least one of the control groups comprises a plurality of targeted communication controls;
   for at least the first and the second user accounts, determining that a threshold quantity of activities violated at least two controls in the control groups comprising:
      detecting that the first and the second user account accessed a first storage device;
      determining that the first user account does not have permission rights to conduct the access to the first storage device, and in response, determining that an activity violation for a first control of the at least two controls has occurred and storing an attribute value of the violation;
      determining that the second user account does have permission rights to conduct the access, and in response, determining that an authorized access occurred and storing an attribute value of the access; and
   responsive to determining that the threshold quantity of activities violated the at least two controls in the control groups, and responsive to determining that an activity violation has occurred, calculating a predictive threat rating for the first user account using the stored attribute value of the violation.

2. The computer-readable medium of claim 1, further comprising instructions that when executed by the processor cause the processor to perform:
   determining whether an indicator is associated with the first user account, wherein the additional indicator is selected from the group consisting of: a prior investigation of a user of the user account, a prior investigation of another individual, the volume or type of information accessible by the user account, whether the user account has an exception to a security policy, and combinations thereof.

3. The computer-readable medium of claim 1, wherein the control groups comprise controls selected from the group consisting of: removable media controls, unencrypted transmission controls, encrypted targeted communication controls, and combinations thereof.

4. The computer-readable medium of claim 1, further comprising instructions that when executed by the processor cause the processor to perform:
   receiving an indication that a first attribute value of an unblocked targeted communication from a first user account is similar to a first attribute value of a blocked transmission from the first user account.

5. The computer-readable medium of claim 4, further comprising instructions that when executed by the processor cause the processor to perform:
   comparing one or more attribute values against criteria to determine if an activity violation occurred.

6. The computer-readable medium of claim 4, further comprising instructions that when executed by the processor cause the processor to perform:
   quantifying a quantity of attribute values of authorized accesses during a first time period; and
   determining if an activity violation occurred.

7. The computer-readable medium of claim 4, wherein the blocked transmission comprises a targeted communication and the first attribute relates to criteria selected from the group consisting of: encryption status, attachment, recipient of a targeted communication, patterns, words, and combinations thereof.

8. The computer-readable medium of claim 1, wherein an attribute of the access is selected from the group consisting of: a filename accessed, a size of a file accessed, a location of a file accessed, metadata regarding a file accessed, or combinations thereof.

9. The computer-readable medium of claim 8, wherein the computer-readable medium is operatively detachable from the processor.

10. The computer-readable medium of claim 9, further comprising instructions that when executed by the processor cause the processor to perform:
    detecting the presence of a removable computer-readable medium; and
    comparing a value identifying the removable computer-readable medium against a collection of identifiers.

11. An apparatus comprising:
    a processor;
    a control module configured to detect activities associated with a plurality of user accounts in regards to a plurality of controls in a plurality of control groups, wherein each user account is associated with a different individual of a business entity, wherein the plurality of user accounts comprises a first user account and a second user account and wherein at least one of the control groups comprises a plurality of targeted communication controls;
    a non-transitory computer-readable medium comprising computer-executable instructions that when executed by the processor cause the apparatus to perform:
    determining that a threshold quantity of activities violated at least two controls in the control groups comprising:
        detecting that a user account accessed a first storage device;
        determining if the user account has permission rights to conduct the access to the first storage device;
        wherein if the user account does not have permission rights to conduct the access, determining that an activity violation has occurred, wherein if the user account does have permission rights to conduct the access, determining that an authorized access occurred and storing an attribute value of the access;
    determining that at least one activity violation has occurred; and
    responsive to determining that the threshold quantity of activities violated at the least two controls in the control groups, and responsive to determining that at least one activity violation has occurred, calculating a predictive threat rating for the first user account.

12. The apparatus of claim 11, wherein the controls are selected from the groups consisting of: removable media controls, unencrypted transmission controls, encrypted targeted communication controls, and combinations thereof.

13. The apparatus of claim 11, wherein the controls consist essentially of: removable media controls, unencrypted transmission controls, encrypted targeted communication controls, and combinations thereof.

14. The apparatus of claim 11, wherein an attribute value of the access relates to an attribute selected from the group consisting of: a filename accessed, a size of a file accessed, a location of a file accessed, metadata regarding a file accessed, or combinations thereof.

15. The apparatus of claim 11, the instructions further comprising:
    detecting the presence of a removable computer-readable medium; and
    comparing a value identifying the removable computer-readable medium against a collection of identifiers.

16. The apparatus of claim 11, the instructions further comprising:
    comparing one or more attribute values against criteria to determine if an activity violation occurred.

17. The apparatus of claim 11, the instructions further comprising:
    quantifying a quantity of attribute values of authorized accesses during a first time period; and
    determining if an activity violation occurred.

18. The apparatus of claim 11, the instructions further comprising:
    receiving an indication that a first attribute value of an unblocked targeted communication from a first user account is similar to a first attribute value of a blocked transmission from the first user account;
    wherein the blocked transmission comprises a targeted communication and the first attribute of the blocked transmission relates to criteria selected from the group consisting of: encryption status, attachment, recipient of a targeted communication, patterns, words, and combinations thereof.

19. A non-transitory computer-readable medium comprising computer-executable instructions that when executed by a processor cause the processor to perform:
    detecting activities associated with a plurality of user accounts in regards to a plurality of control groups, wherein at least one of the control groups comprises a plurality of targeted communication controls;
    determining that a threshold quantity of activities violated at least two controls in the control groups comprising:
        detecting that a user account accessed a first storage device;
        determining if the user account has permission rights to conduct the access to the first storage device;
        wherein if the user account does not have permission rights to conduct the access, determining that an activity violation has occurred, wherein if the user account does have permission rights to conduct the access, determining that an authorized access occurred and storing an attribute value of the access;
    determining that at least one activity violation has occurred; and
    responsive to determining that the threshold quantity of activities violated at the least two controls in the control groups, and responsive to determining that at least one activity violation has occurred, calculating a predictive threat rating for the first user account.

20. The computer-readable medium of claim 19, wherein an attribute value of the authorized access relates to an attribute selected from the group consisting of: a filename accessed, a size of a file accessed, a location of a file accessed, metadata regarding a file accessed, and combinations thereof.

* * * * *